US008544748B2

(12) United States Patent
Ming

(10) Patent No.: US 8,544,748 B2
(45) Date of Patent: *Oct. 1, 2013

(54) CREATION AND PLACEMENT OF TWO-DIMENSIONAL BARCODE STAMPS ON PRINTED DOCUMENTS FOR STORING AUTHENTICATION INFORMATION

(75) Inventor: Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 432 days.

This patent is subject to a terminal disclaimer.

(21) Appl. No.: 12/341,966

(22) Filed: Dec. 22, 2008

(65) Prior Publication Data
US 2010/0155479 A1 Jun. 24, 2010

(51) Int. Cl.
G06K 7/10 (2006.01)

(52) U.S. Cl.
USPC .................................. 235/462.1; 235/462.04

(58) Field of Classification Search
USPC ................ 235/462.01, 462.1, 462.04, 487, 235/494
See application file for complete search history.

(56) References Cited

U.S. PATENT DOCUMENTS

| 5,866,895 | A | 2/1999 | Fukuda et al. |
| 6,483,570 | B1 | 11/2002 | Slater et al. |
| 7,092,116 | B2 | 8/2006 | Calaway |
| 7,575,168 | B2 | 8/2009 | Suomela et al. |
| 8,081,348 | B2 | 12/2011 | Hosoda |
| 2005/0008261 | A1 | 1/2005 | Wolff et al. |
| 2006/0027660 | A1 | 2/2006 | Ming et al. |
| 2007/0176001 | A1* | 8/2007 | Cattrone et al. ......... 235/462.01 |
| 2007/0204164 | A1 | 8/2007 | Cattrone et al. |
| 2007/0278303 | A1* | 12/2007 | Cattrone ..................... 235/462.1 |
| 2008/0000991 | A1* | 1/2008 | Yin et al. ..................... 235/494 |
| 2008/0002853 | A1* | 1/2008 | Kawabe et al. ............... 382/100 |
| 2008/0173718 | A1 | 7/2008 | Ibe |
| 2010/0025472 | A1* | 2/2010 | Morgana et al. ......... 235/462.04 |

FOREIGN PATENT DOCUMENTS

| JP | 2007-115212 | 5/2007 |
| JP | 2007-300602 | 11/2007 |
| JP | 2008-059358 | 3/2008 |
| JP | 3140564 U | 3/2008 |
| JP | 2008-097066 | 4/2008 |
| JP | 2008-181195 | 8/2008 |

OTHER PUBLICATIONS

Japanese Office Action, dated May 21, 2013, in a counterpart Japanese patent application, No. JP 2009-287441.

* cited by examiner

Primary Examiner — Daniel St. Cyr
(74) Attorney, Agent, or Firm — Chen Yoshimura LLP

(57) ABSTRACT

A document authenticating method is disclosed by which a plurality of two-dimensional barcode stamps are generated and printed on a back side of the document forming a color mosaic pattern. Each barcode stamp by itself is a binary barcode, but the plurality of barcode stamps as a whole are printed with different colors and/or color intensities. The barcode stamps collectively encode the content of the document to be used for document authentication.

22 Claims, 2 Drawing Sheets

CREATION AND PLACEMENT OF TWO-DIMENSIONAL BARCODE STAMPS ON PRINTED DOCUMENTS FOR STORING AUTHENTICATION INFORMATION

CROSS REFERENCE TO RELATED APPLICATIONS

This application cross-references and incorporates by reference U.S. patent application Ser. No. 12/338,945, filed Dec. 18, 2008, entitled "Creation and placement of two-dimensional barcode stamps on printed documents for storing authentication information".

BACKGROUND OF THE INVENTION

1. Field of the Invention

This invention relates to the application of two-dimensional barcode, typically in document authentication, and in particular, it relates to the creation and placement of barcode stamps on printed documents.

2. Description of Related Art

Barcode is a form of machine-readable symbology for encoding data, and has been widely introduced in a variety of application fields. Two-dimensional barcode (2d barcode) is one mode of such symbology. It can be used to encode text, numbers, images, and binary data streams in general, and has been used in identification cards, shipping labels, certificates and other documents, etc. Examples of widely used 2d barcode standards include PDF417 standard and QR Code®, and software and hardware products have been available to print and read such 2d barcodes.

Original digital documents, which may include text, graphics, images, etc., are often printed, and the printed hard copy are distributed, copied, etc., and then often scanned back into digital form. This is referred to as a closed-loop process. Authenticating a scanned digital document refers to determining whether the scanned document is an authentic copy of the original digital document, i.e., whether the document has been altered while it was in the hard copy form. Alteration may occur due to deliberate effort or accidental events. Methods have been proposed to authenticate a printed document using 2d barcode. Specifically, the method includes encoding the content of the document in a 2d barcode (the authentication barcode), and printing the barcode on the same recording medium as the printed document. The content of the document may be a bitmap image of a page of the document, text, graphics or images contained within the document, or a mixture thereof. To authenticate a printed document bearing an authentication barcode, the document is scanned to obtain scanned data that represents the content of the document, e.g. a bitmap image, text extracted by using an optical character recognition (OCR) technology, etc. The authentication barcode is also scanned and the data contained therein (the authentication data) is extracted. The scanned data is then compared to the authentication data to determine if any part of the printed document has been altered since it was originally printed, i.e. whether the document is authentic. Some authentication technologies merely determine whether any alterations have occurred, some are able to determine what content has been altered and what the alterations are. A printed document bearing authentication barcode is said to be self-authenticating because no information other than what is on the printed document is required to authenticate its content.

SUMMARY

The present invention is directed to a method and related apparatus for encoding document authentication data in two-dimensional barcode stamps and arranging the barcode stamps in a special pattern on the back side of the printed document.

An object of the present invention is to generate a document with authenticating barcode stamps that has a more appealing appearance.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for printing a document, which includes: obtaining a content of the document; obtaining metadata to be encoded in barcode stamps; generating a plurality of two-dimensional barcode stamps encoding the metadata, each barcode stamp being a binary barcode, and the plurality of barcode stamps have different colors; and printing the content of the document and the plurality of barcode stamps on a recording medium.

The plurality of barcode stamps are arranged to form a regular array of barcode stamps. The metadata may include authentication data. The content of the document and the plurality of barcode stamps may be printed on opposite sides of the recording medium. Each barcode stamp may have a uniform color for the printed tiles, or the printed tiles may have different colors.

The authenticating process includes scanning the printed document scanning the printed document including the content of the document and the plurality of barcode stamps and extracting and decoding the metadata encoded in the plurality of barcode stamps.

In another aspect, the present invention provides a method for generating at least one barcode stamp, which includes: obtaining data to be encoded in the at least one barcode stamp; generating the at least one barcode stamp encoding the data, the at least one barcode stamp having a plurality of tiles of at least first, second and third colors, wherein the first, second and third colors are mutually different colors, and wherein two of the first, second and third colors represent a first data state, wherein the remaining one of the first, second and third colors represents a second data state different from the first data state; and printing the at least one barcode stamp on a recording medium.

In another aspect, the present invention provides a computer program product that controls a data processing apparatus to perform the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

To generate a self-authenticating document using 2d barcodes, a relatively large amount of data representing the content of the document must be encoded in the barcodes (referred to as the authentication barcodes). The content of the document may include bitmap images, graphics, and text. The text may originate from the application that created the document, or extracted from images using optical character recognition (OCR) techniques. The size of the barcode stamps may be, for example, 1 cm by 1 cm and the tile size may be, for example, 6 by 6 pixels (dots) at a resolution of 400 dpi. Here, barcode stamps refer to individual blocks each having well defined boundaries and constituting a barcode; tiles refer to the small black (or colored) and white elements arranged in a defined pattern that collectively comprise a barcode stamp. In a binary barcode, each tile is either white (unprinted or uncolored) or printed with a fixed color (typically black, but can also be another color), and each tile represents a 1-bit value. In a color barcode, each tile is either white (unprinted or uncolored) or printed with one of multiple colors, such as cyan, magenta, yellow, etc. at a color intensity value. Each tile in a color barcode represents a multi-bit value. To read a color barcode, the printed barcode must be scanned using a scanner with color capabilities and the scanned color values must be decoded, which require hardware and software having sophisticated color calibration and correction capabilities. In this disclosure and the appended claims, unless otherwise specified, the terms "white", "unprinted" and "uncolored" are used interchangeably to mean that no color is applied in the printing process so the color of the tile is the color of the recording medium itself.

Multiple barcode stamps are typically needed to encode the content of a page of document for authentication purposes. For example, using binary barcode stamps having stamps size and tile size in the above example, more than forty stamps may be required to encode the content of one typical page of document. Such stamps must be placed in a white area of the document where no document image exists. There is often insufficient white area on the document to print the stamps. It has been proposed to print the stamps on the backside of the document. The stamps are typically arranged in a regular array pattern as such a pattern can accommodate maximum numbers of stamps. However, arranging binary barcode stamps of the same color in a regular array pattern may have an unattractive appearance.

Figure 1:
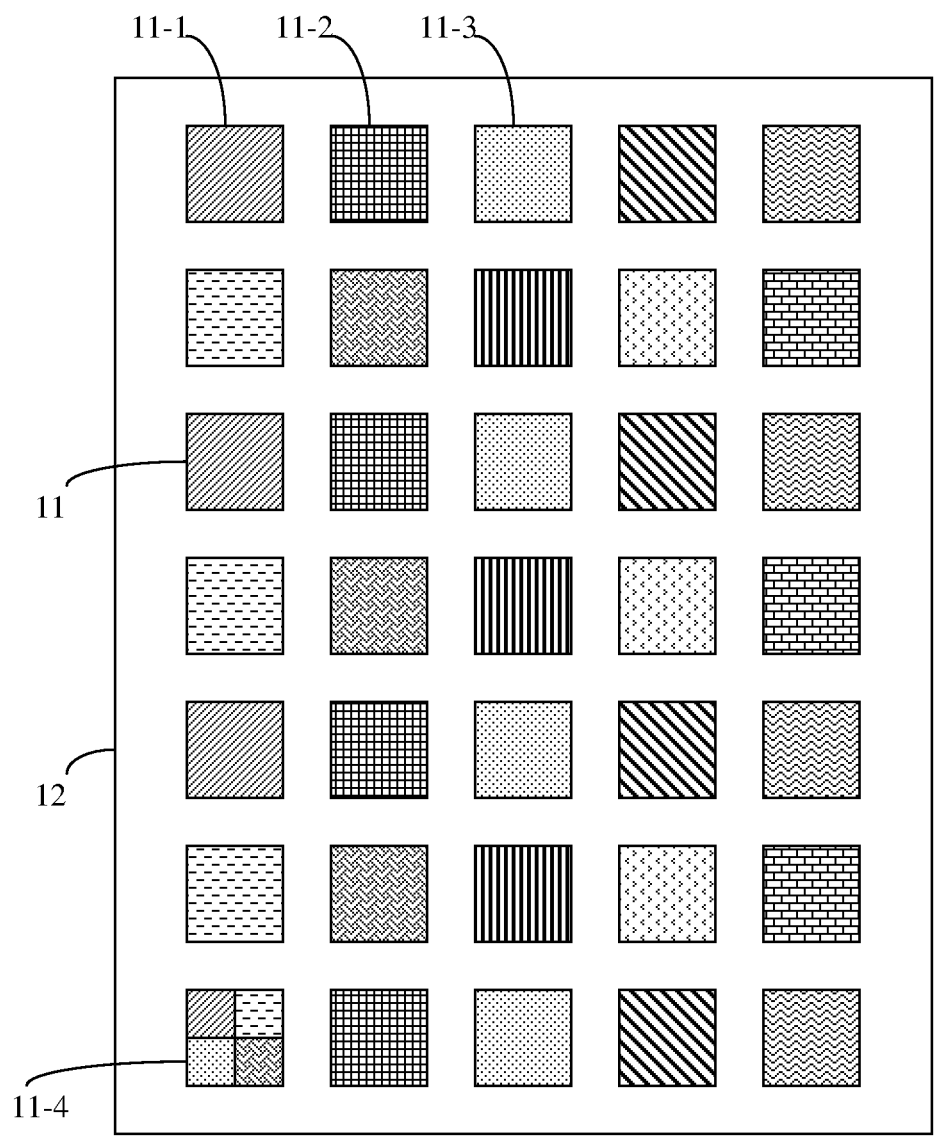
FIG. 1 schematically illustrates a plurality of barcode stamps printed on a back side of printed document forming a color mosaic pattern according to an embodiment of the present invention.

Embodiments of the present invention provide a document authentication method by which a plurality of barcode stamps are generated and arranged in a color mosaic patterns on the printed document. As schematically illustrated in FIG. 1, a plurality of barcode stamps 11 are printed on the back side 12 of the printed document to encode authentication information. The barcode stamps 11 are arranged in an array pattern. Each barcode stamp 11, by itself, is a binary stamp, but different colors and different color intensities (gradations) are used to print the different stamps. For example, the stamp 11-1 may have blue and white tiles where the blue tiles have a 100% color intensity, the stamp 11-2 may have magenta and white tiles where the magenta tiles have a 50% color intensity, etc. Of course, non-primary colors may also be used. In this disclosure and the appending claims, unless otherwise specified, the term "colors" includes "color intensities"; therefore "the same color" means the same color and same color intensity, and "different colors" means either the color or the color intensity or both are different. The binary barcode stamps 11 having different colors are arranged in an array to form a color mosaic pattern. A default color mosaic pattern may be used, or the user may define a customized color mosaic pattern.

A mosaic pattern may be defined by a data file containing color values for the plurality of barcode stamps. Alternatively, the color values of the next barcode may be encoded in the current barcode stamp. Such information can also be used as a auxiliary means to verify the authenticity of barcodes. For example, if the current barcode stamp indicates that the next barcode stamp is printed in blue, but the next barcode stamp is in fact not printed in blue, then the barcode could be deemed unauthentic.

Any color mosaic patterns may be used. Same colored stamps may be scattered or arranged adjacent each other. For example, an undulating pattern may be formed by placing a row of 100% intensity blue stamps, a row of 50% intensity blue stamps below it, a row of 50% intensity magenta stamps below it, a row of 100% intensity magenta stamps below it, etc. The color mosaic pattern may serve as a logo.

The colors in the color mosaic pattern may be designed to carry certain information. For example, barcode stamps with different colors may encode different type of data. For example, barcode stamps in red color may encode registration information such as operator name, timestamp, etc.; barcode stamps in green color may encode text info of the document; etc. Such color coding may be used for different authentication purposes and can improve system performance. Different colors may also be used to indicate different levels of security requirements; for example, red color may be used for primary information, while yellow color is used for auxiliary information, etc. Alternatively or in addition, in case where the document is a data file in which objects of different attributes or different type, such as text, image, and graphics, are contained, different colors for barcode stamps may be used to respectively accommodate information on the objects of the different objects; for example, red color may be used to accommodate the information on text objects, blue color may be used to accommodate the information on image objects, and green color may be used to accommodate the information on graphics objects.

Although the barcode stamps are printed with colors, they are treated as binary barcodes during the barcode reading process. In other words, each tile is treated as either printed or unprinted, regardless of the actual color used to print the barcode stamp. Thus, sophisticated color calibration and color correction are not necessary to read the barcodes. It should be noted that while precise color calibration and color correction are not necessary to read the barcodes, some color calibration and correction may be desirable, depending on printer and scanner's stability and quality, to improve performance.

In one embodiment, each barcode stamp has a uniform color, i.e., the printed tiles in each barcode stamp has the same color. In another embodiment, the barcode stamps are partitioned into different parts and the different parts are printed with different colors. In the example illustrated in FIG. 1, the barcode stamp 11-4 is partitioned in to four parts having different colors. A partitioned barcode stamp is still a binary barcode where each tile represents a 1-bit value. In yet another embodiment, tiles within the same barcode stamp may have different color values. In such a barcode stamp, each tile is either printed (regardless of the color) or not printed (white) and represents a 1-bit value.

As another alternative, the "white," "uncolored" or "unprinted" tiles may be printed with a color, as long as the colors for the "white" tiles can be unambiguously distinguished from the colors of the "printed" tiles in the barcode reading process. In all of the above examples, the barcode stamps are binary barcode where each tile represents a 1-bit value. In other words, each "white" tile can represent or express one state of binary data (e.g., "0"), while each "printed" tile can represent or express another one state of binary data (e.g., "1"). Alternatively, in a case where tiles actually printed or colored are to be treated as "white" tiles, they can represent or express the one state of binary data (e.g., "0").

More generally, each binary barcode stamp contains two types of tiles, and any suitable color values may be used for the two types of tiles as long as the two types of tiles can be unambiguously distinguished from each other. In these cases, depending on the type of barcode in use, it may be desirable to indicate the colors of "printed" tile and "unprinted" tile to avoid mis-decoding. Indicating the colors can be done by encoding the information in neighbor barcode stamps, or specifying the information in a data file, etc.

Figure 2:
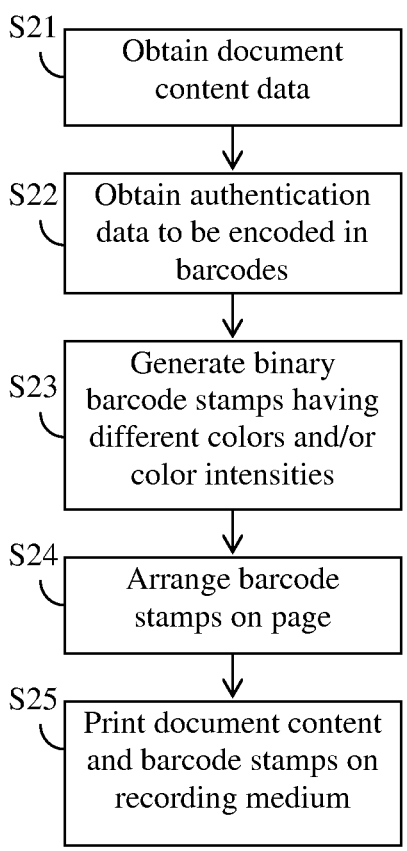
FIG. 2 illustrates a process of generating a printed document bearing barcode stamps for document authentication according to an embodiment of the present invention.

Methods of generating 2d barcode stamps for document authentication are generally known to those skilled in the relevant art. Embodiments of the present invention provide a modified method to form the color mosaic stamp patterns. The method may be implemented by software in a computer, printer or other data processing apparatus. As shown in FIG. 2, the process first obtains the document content data (step S21). The data may originate from an application program such as a word processing application, a PDF writer application, etc., or from scanning a hard copy of a document. The document content data may be in any appropriate format, such as text, bitmap image, etc. The process then obtains authentication data to be encoded in barcodes (step S22). This step may include processing the document content data to obtain the authentication data, such as compressing the document content data, digitally signing the data (optional), and encrypting the data (optional). Compression is optional but is generally desired to reduce data size. Other processing may also be performed on the document content data, such as extracting text data from image data using OCR techniques, down sampling image data to reduce its size, etc. Alternatively or in addition, step S22 may include obtaining the data to be encoded in barcodes from an independent source, such as the application that created the document.

The authentication data is then encoded to generate a plurality of barcode stamps (step S23). As described earlier, each barcode stamp is a binary stamp but different colors are used to print the stamps. A conventional method may be used to generate the barcode stamps, except that the color values for the "printed" tiles in each stamp are the predetermined values stored in the data file that define the color mosaic pattern.

The barcode stamps are arranged on the document, such as the back side of the printed page, forming a color mosaic pattern (step S24). The document and the barcode stamps are then printed (step S25).

Figure 3:
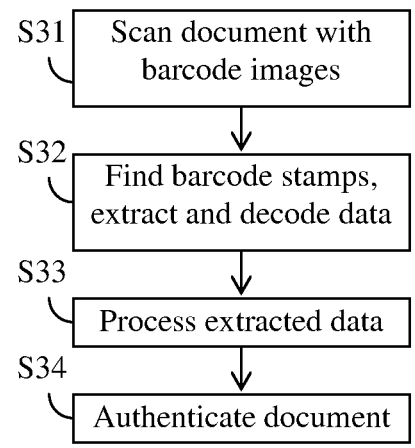
FIG. 3 illustrates a process for scanning a printed document bearing barcode stamps and authenticating the document according to an embodiment of the present invention.

In the authenticating process, shown in FIG. 3, the document is scanned (step S31). The barcode stamps are identified and the data encoded therein is extracted and decoded (step S32). As described earlier, each barcode stamp is treated as a binary barcode, and sophisticated color calibration and color correction are not required. As noted earlier, some color calibration and correction may be desirable, depending on printer and scanner's stability and quality, to improve performance. The data decoded from the barcode stamps is processed (step S33), including decryption (optional), digital signature verification (optional), decompression, etc. The processed data is used to authenticate the document (step S34). The process of authenticating a document using extracted data is generally known to those skilled in the relevant art and a more detailed description is omitted here.

Although embodiments of the present invention are described above in the context of document authentication, the invention may be used when barcodes are printed on document for other purposes. For example, barcode stamps may be printed on documents to store metadata about the document, such as filename, author, title, subject, category, keywords, comments, revision number, etc. The data to be encoded in barcodes may be generally referred to as metadata in this disclosure. The invention is especially advantageous when the amount of metadata (such as authentication data) to be encoded in the barcode stamps is large.

It will be apparent to those skilled in the art that various modification and variations can be made in the barcode creation and placement method of the present invention without departing from the spirit or scope of the invention. Thus, it is intended that the present invention cover modifications and variations that come within the scope of the appended claims and their equivalents.

What is claimed is:

1. A method for printing barcode stamps, comprising:
obtaining data to be encoded in barcode stamps, including a plurality of types of data;
generating a plurality of two-dimensional barcode stamps encoding the data, each barcode stamp being an individual block with defined boundaries and having a plurality of printed tiles and unprinted tiles, each tile representing one state of binary data, the printed tiles of each barcode stamp having the same color, the colors of the printed tiles of at least some of the plurality of barcode stamps being different, wherein the colors of the printed tiles of the barcode stamps are correlated with the types of data being encoded by the respective barcode stamps; and
printing the plurality of barcode stamps on a recording medium.

2. The method of claim 1, wherein the plurality of barcode stamps are arranged to form a regular array of barcode stamps.

3. The method of claim 1, further comprising:
obtaining a content of a document;
wherein the plurality of types of data being encoded in the barcode stamps includes a plurality of types of metadata regarding the document; and
printing the content of the document on the same recording medium as the plurality of barcode stamps to produce a printed document.

4. The method of claim 3, wherein the content of the document and the plurality of barcode stamps are printed on opposite sides of the recording medium.

5. The method of claim 3, wherein the metadata includes authentication data.

6. The method of claim 3, further comprising:
scanning the printed document including the content of the document and the plurality of barcode stamps; and
extracting and decoding the metadata encoded in the plurality of barcode stamps.

7. The method of claim 6, wherein the metadata includes authentication data, the method further comprising authenticating the scanned document using the authentication data.

8. The method of claim 6, wherein the extracting step comprises extracting a type of data from barcode stamps that have a color of the printer tiles correlated with the type of data.

9. The method of claim 3, wherein barcode stamps having printed tiles of a first color encode registration information regarding the document, and barcode stamps having printed tiles of a second color encode text info of the document.

10. The method of claim 3, wherein barcode stamps having printed tiles of different colors indicate different levels of security requirements.

11. The method of claim 3, wherein the document contains objects of different types, and wherein barcode stamps having printed tiles of different colors encode information regarding the objects of the different types.

12. A computer program product comprising a computer usable non-transitory medium having a computer readable code embodied therein for controlling a data processing apparatus, the computer readable program code configured to cause the data processing apparatus to execute a process for printing barcode stamps comprising the steps of:
    obtaining data to be encoded in barcode stamps, including a plurality of types of data;
    generating a plurality of two-dimensional barcode stamps encoding the data, each barcode stamp being an individual block with defined boundaries and having a plurality of printed tiles and unprinted tiles, each tile representing one state of binary data, the printed tiles of each barcode stamp having the same color, the colors of the printed tiles of at least some of the plurality of barcode stamps being different, wherein the colors of the printed tiles of the barcode stamps are correlated with the types of data being encoded by the respective barcode stamps; and
    submitting the plurality of barcode stamps for printing on a recording medium.

13. The computer program product of claim 12, wherein the plurality of barcode stamps are arranged to form a regular array of barcode stamps.

14. The computer program product of claim 12, wherein the content of the document and the plurality of barcode stamps are printed on opposite sides of the recording medium.

15. The computer program product of claim 12, wherein the metadata includes authentication data.

16. The computer program product of claim 12, wherein the process further comprises:
    scanning the printed document including the content of the document and the plurality of barcode stamps; and
    extracting and decoding the metadata encoded in the plurality of barcode stamps.

17. The computer program product of claim 16, wherein the metadata includes authentication data, the method further comprising authenticating the scanned document using the authentication data.

18. The computer program product of claim 16, wherein the extracting step comprises extracting a type of data from barcode stamps that have a color of the printer tiles correlated with the type of data.

19. The computer program product of claim 12 wherein the process further comprises:
    obtaining a content of a document;
    wherein the plurality of types of data being encoded in the barcode stamps includes a plurality of types of metadata regarding the document; and
    submitting the content of the document for printing on the recording medium.

20. The computer program product of claim 12, wherein barcode stamps having printed tiles of a first color encode registration information regarding the document, and barcode stamps having printed tiles of a second color encode text info of the document.

21. The computer program product of claim 12, wherein barcode stamps having printed tiles of different colors indicate different levels of security requirements.

22. The computer program product of claim 12, wherein the document contains objects of different types, and wherein barcode stamps having printed tiles of different colors encode information regarding the objects of the different types.

* * * * *